(12) United States Patent
Jun et al.

(10) Patent No.: US 11,039,065 B2
(45) Date of Patent: Jun. 15, 2021

(54) IMAGE SIGNAL PROCESSING METHOD, IMAGE SIGNAL PROCESSOR, AND ELECTRONIC DEVICE

(71) Applicant: Samsung Electronics Co., Ltd., Suwon-si (KR)

(72) Inventors: Jae Sung Jun, Seoul (KR); Kyong Tae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/318,057

(22) PCT Filed: Jun. 20, 2017

(86) PCT No.: PCT/KR2017/006429
§ 371 (c)(1),
(2) Date: Jan. 15, 2019

(87) PCT Pub. No.: WO2018/034418
PCT Pub. Date: Feb. 22, 2018

(65) Prior Publication Data
US 2019/0297256 A1 Sep. 26, 2019

(30) Foreign Application Priority Data
Aug. 18, 2016 (KR) .................. 10-2016-0105117

(51) Int. Cl.
*H04N 5/225* (2006.01)
*H04N 5/232* (2006.01)
(Continued)

(52) U.S. Cl.
CPC ........... *H04N 5/23229* (2013.01); *G06T 1/20* (2013.01); *H04N 5/217* (2013.01); *H04N 5/235* (2013.01); *H04N 5/357* (2013.01); *H04N 9/73* (2013.01)

(58) Field of Classification Search
None
See application file for complete search history.

(56) References Cited

U.S. PATENT DOCUMENTS

| 7,555,140 B2 | 6/2009 | Nakami |
| 7,945,109 B2 | 5/2011 | Nakami |

(Continued)

FOREIGN PATENT DOCUMENTS

| EP | 1 427 207 A1 | 6/2004 |
| JP | 2000-196949 A | 7/2000 |

(Continued)

OTHER PUBLICATIONS

European Search Report dated Jun. 18, 2019, issued in the European Application No. 17841602.0.

*Primary Examiner* — Twyler L Haskins
*Assistant Examiner* — Dwight Alex C Tejano
(74) *Attorney, Agent, or Firm* — Jefferson IP Law, LLP

(57) ABSTRACT

An electronic device according to an embodiment of the present disclosure comprises: an image sensor for generating image data on the basis of incident light; and a plurality of image processing blocks (IP blocks), and may comprise an image signal processor (ISP) for processing the image data. The image signal processor may set a first processing path and a second processing path by at least one IP block among the plurality of image processing blocks on the basis of designated control information, divide the image data into first image data and second image data when the image data is received, process the first image data by using a first group image processing block on the first processing path, and process the second image data by using a second group image processing block on the second processing path. Various other embodiments understood from the specification are also possible.

14 Claims, 11 Drawing Sheets

(51) Int. Cl.
  *G06T 1/20* (2006.01)
  *H04N 5/217* (2011.01)
  *H04N 5/235* (2006.01)
  *H04N 5/357* (2011.01)
  *H04N 9/73* (2006.01)

(56) References Cited

U.S. PATENT DOCUMENTS

| | | |
|---|---|---|
| 8,027,551 B2 | 9/2011 | Chien et al. |
| 9,973,677 B2 | 5/2018 | Venkatraman et al. |
| 2004/0234153 A1 | 11/2004 | Nakami |
| 2008/0114974 A1 | 5/2008 | Chien et al. |
| 2008/0131109 A1* | 6/2008 | Honjo ................ H04N 5/23212 396/123 |
| 2009/0066819 A1* | 3/2009 | Ando ...................... G06T 5/009 348/254 |
| 2009/0153699 A1* | 6/2009 | Satoh .................. H04N 5/2353 348/229.1 |
| 2009/0262983 A1 | 10/2009 | Nakami |
| 2011/0234845 A1* | 9/2011 | Fujiwara ............ H04N 5/23219 348/223.1 |
| 2011/0279698 A1* | 11/2011 | Yoshikawa .......... H04N 5/2258 348/222.1 |
| 2012/0013769 A1* | 1/2012 | Kiyosawa .............. H04N 5/142 348/234 |
| 2012/0188394 A1* | 7/2012 | Park ........................ G06T 5/008 348/222.1 |
| 2014/0071310 A1* | 3/2014 | Kai .................... G06K 9/00281 348/223.1 |
| 2014/0168463 A1* | 6/2014 | Tamura .................. H04N 9/735 348/223.1 |
| 2015/0103192 A1 | 4/2015 | Venkatraman et al. |
| 2015/0130828 A1* | 5/2015 | Watanabe .......... H04N 5/23245 345/589 |
| 2015/0161773 A1 | 6/2015 | Takahashi et al. |
| 2016/0110168 A1 | 4/2016 | Feder et al. |
| 2017/0109864 A1* | 4/2017 | Ohba ...................... G06T 5/002 |

FOREIGN PATENT DOCUMENTS

| | | |
|---|---|---|
| KR | 10-2011-0033421 A | 3/2011 |
| KR | 10-2016-0070780 A | 6/2016 |
| WO | 2012/081332 A | 6/2012 |

* cited by examiner

IMAGE SIGNAL PROCESSING METHOD, IMAGE SIGNAL PROCESSOR, AND ELECTRONIC DEVICE

TECHNICAL FIELD

Embodiments disclosed in the present disclosure relate to a method for processing an image signal, an image signal processor, and an electronic device.

BACKGROUND ART

As information technologies (ITs) are highly developed, a camera has evolved from a traditional film camera into a digital camera. The digital camera may convert light into an electrical image signal and may store the electrical image signal as digital data (image data).

The digital camera may generate an image by converting light into an electrical signal through an image sensor, and may correct the generated image through an image signal processor (ISP). The image generated from the image sensor may be corrected similarly to an image actually recognized by a human being. Further, the ISP may apply a graphic effect, which is intended by a user, to the image generated from the image sensor.

DISCLOSURE

Technical Problem

According to typical image processing, the whole area (or the whole image data) of the image from the image sensor is corrected without variation. However, since the whole area of the image is corrected by the ISP, correction is performed with respect to both a portion of the image that does not require specific correction and a portion of the image, an image correction effect of which reduces effect of different correction. This causes computing resources and memory resources of the electronic device to be excessively consumed.

Embodiments disclosed in the present disclosure are suggested to solve the above-described problems and problems issued in the present disclosure and are to provide a method for processing an image signal, an image signal processor, and an electronic device, capable of establishing mutually different image signal processing chains for a specified area and a remaining area.

Technical Solution

According to an embodiment disclosed in the present disclosure, an electronic device may include an image sensor to generate image data based on light that is incident, and an image signal processor (ISP) including a plurality of image processing (IP) blocks and processing the image data. The ISP may establish a first processing chain and a second processing chain by at least one image processing block of the plurality of image processing blocks, based on specified control information, may divide the image data into first image data and second image data, when receiving the image data, may process the first image data by using a first group of image processing blocks on the first processing chain, and may process the second image data by using a second group of image processing blocks on the second processing chain.

In addition, according to an embodiment disclosed in the present disclosure, an image signal processor (ISP) may include a plurality of image processing (IP) blocks, and a controller to establish a processing chain by at least one image processing block of the plurality of image processing blocks, based on specified control information. When image data generated by an image sensor is received, a preset IP block may divide the image data into first image data and second image data, a first group of IP blocks may process the first image data along a first processing chain established by the controller, and a second group of IP blocks may process the second image data along a second processing chain established by the controller.

In addition, according to an embodiment disclosed in the present disclosure, a method for processing an image signal may include dividing, when receiving an image data from an image sensor, the image data into first image data and second image data, establishing a first processing chain and a second processing chain by at least one image processing block of a plurality of image processing blocks, based on specified control information, processing the first image data by using a first group of image processing blocks on the first processing chain, and processing the second image data by using a second group of image processing blocks on the second processing chain.

Advantageous Effects

According to the image signal processor and the electronic device in the embodiments disclosed in the present disclosure, when specific correction processing is unnecessary for a partial area (e.g., the background of an image), the unnecessary specific correction processing may be bypassed. When the effect of another image correction processing is lowered due to the specific correction processing (e.g., out of focus), the correction processing causing the effect to be significantly lowered may be bypassed. The time and the computing/memory resources required in image processing may be significantly reduced while a corrected image is acquired without actual difference in the final image quality. Besides, a variety of effects directly or indirectly understood through the present disclosure may be provided.

MODE FOR INVENTION

Figure 1:
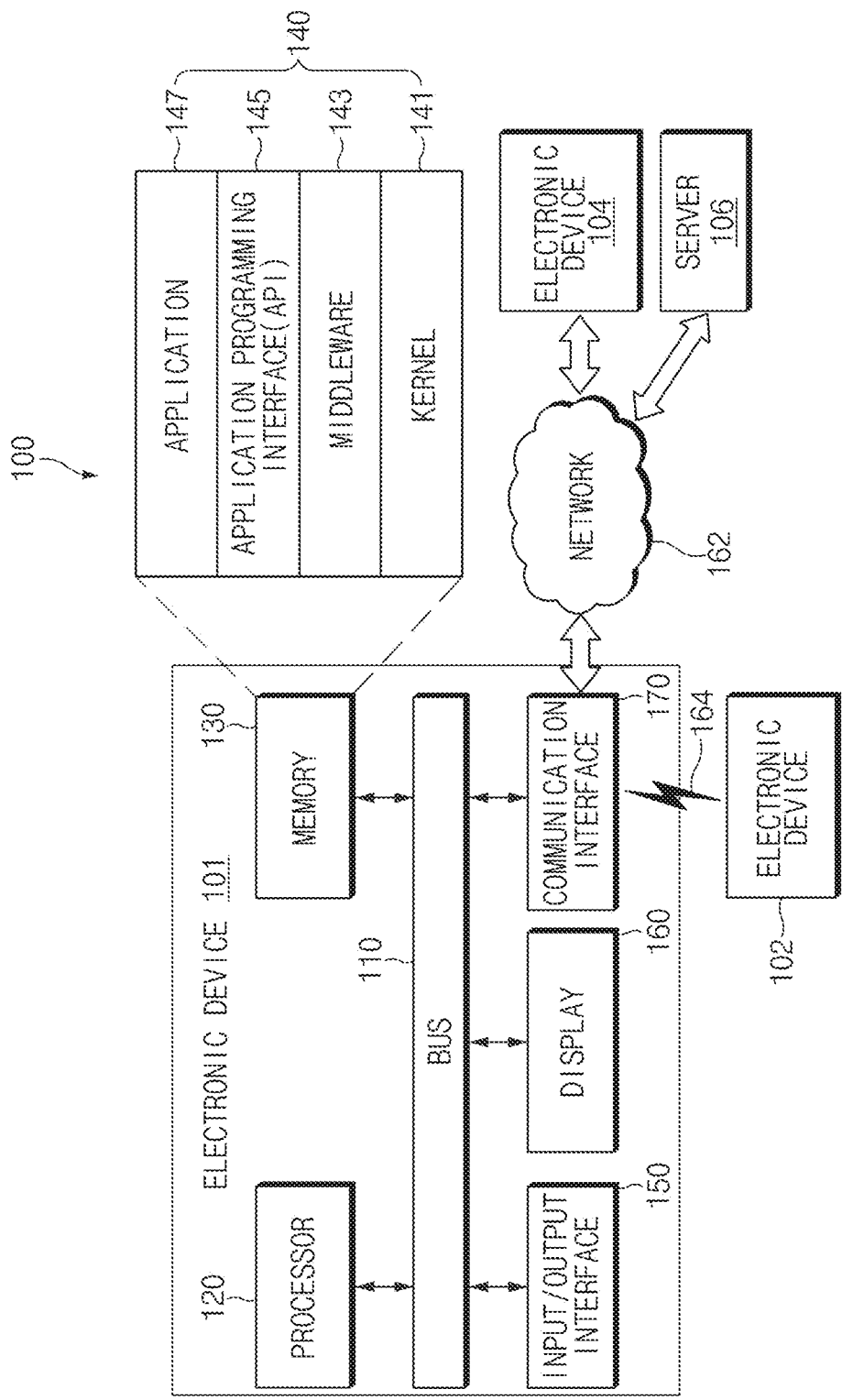
FIG. 1 illustrates an electronic device, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device, according to various embodiments.

Referring to FIG. 1, according to various embodiments, an electronic device 101, 102, and 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), radio frequency (RF), body area network (BAN), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
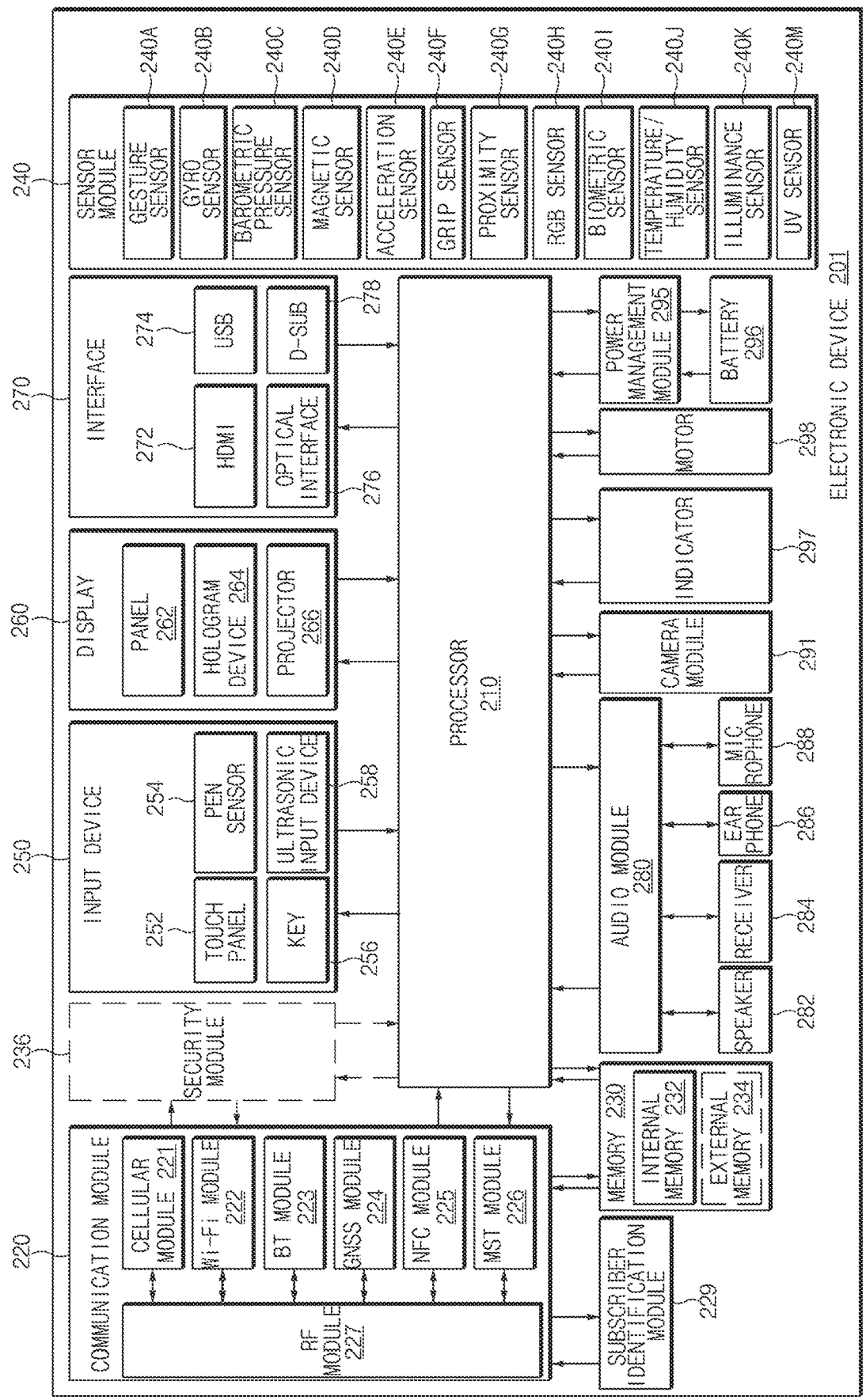
FIG. 2 illustrates a block diagram of the electronic device, according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the touch panel 252 may include a pressure sensor (or force sensor, interchangeably used hereinafter) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
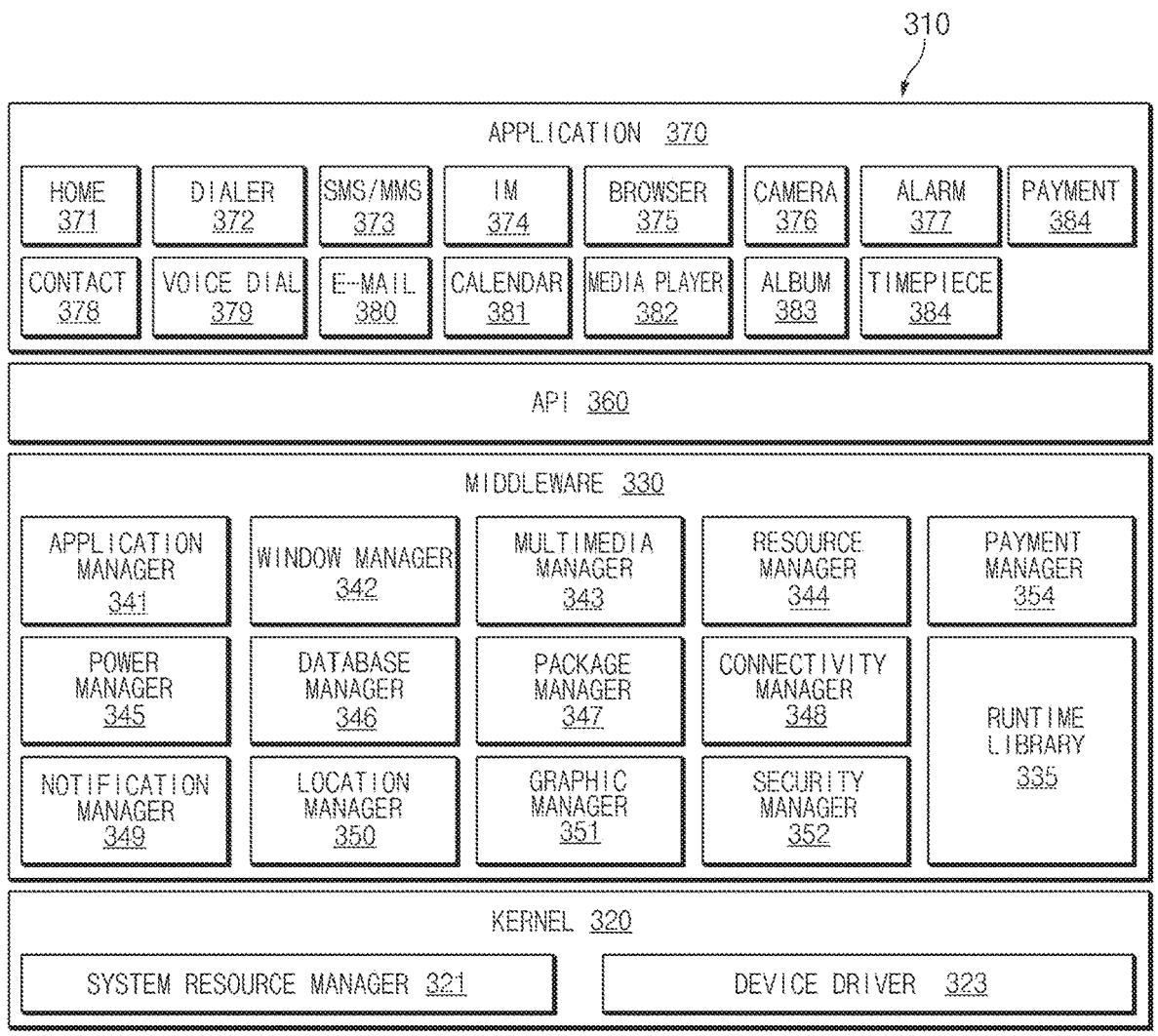
FIG. 3 illustrates a block diagram of a program module according to embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™ iOS™, Windows™, Symbian™, Bada™, or Tizen™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, and a payment 385 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
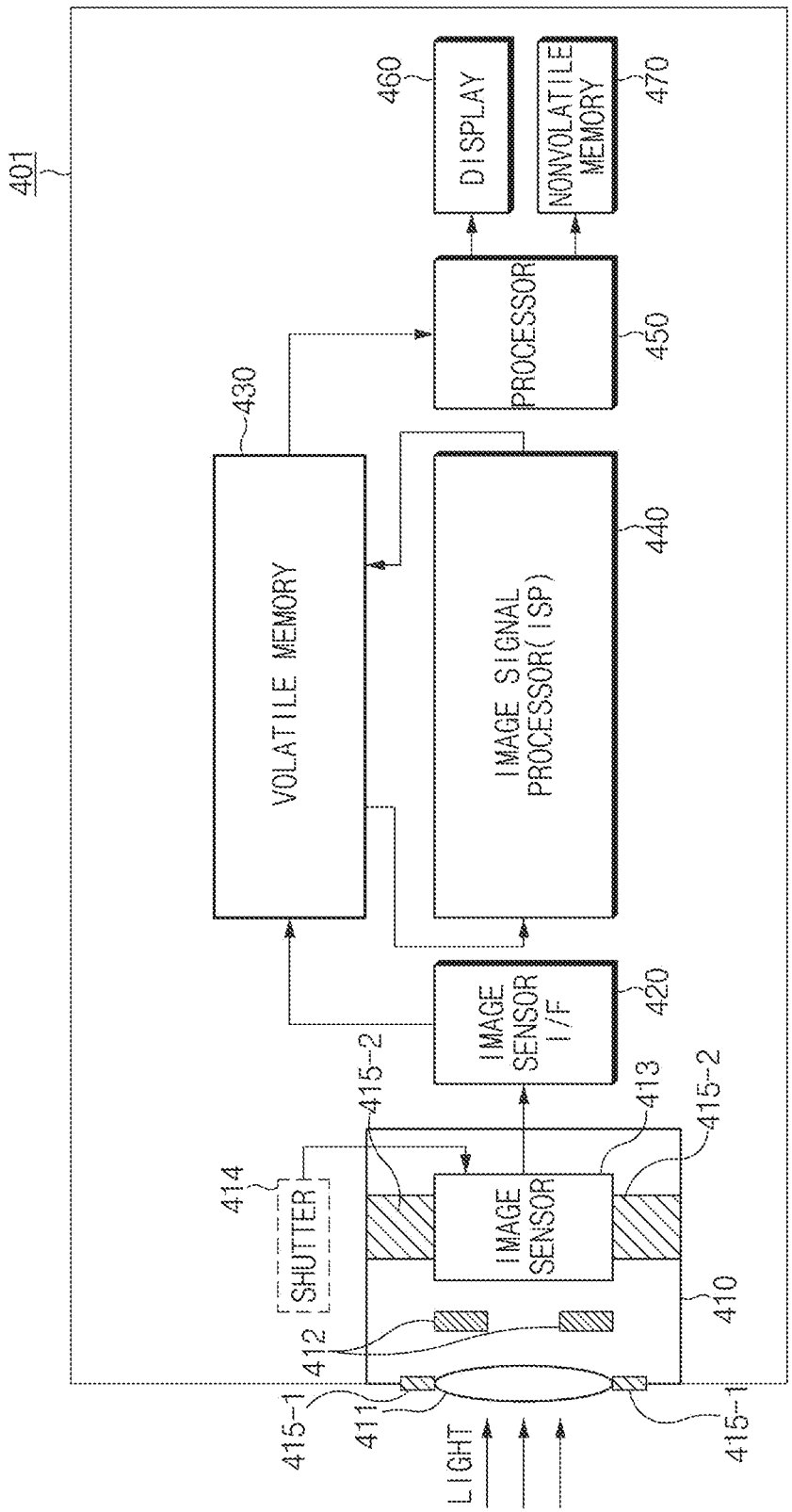
FIG. 4 illustrates a block diagram of an electronic device, according to an embodiment.

FIG. 4 illustrates a block diagram of an electronic device, according to an embodiment.

Referring to FIG. 4, according to an embodiment, an electronic device 401 may include a camera module 410, an image sensor interface (I/F) 420, a calibration module 430, a volatile memory 430, an image signal processor 440, a processor 450, a display 460, and a nonvolatile memory 470. The electronic device 401 illustrated in FIG. 4 may correspond to electronic devices illustrated in FIGS. 1 to 3, and the redundant repeats of components corresponding to each other will be omitted. According to various embodiments, the electronic device 401 may be implemented without some components or may be implemented to further include one or more components not illustrated.

The camera module 410 may include a lens 411, an aperture (or diaphragm) 412, an image sensor 413, a shutter 414, optical image stabilization (OIS) modules 415-1 and 415-2. According to various embodiments, the camera module 410 may be implemented without some components or may be implemented to further include one or more components not illustrated.

The lens 411 may condense light incident to the camera module 410 from the outside. The condensed light may reach the image sensor 413 through the aperture 412. In other words, the lens 411 may allow light reflected from a subject or light emitted from the subject to reach the image sensor 413.

The aperture 412 may adjust an amount (light amount) of light reaching a pixel array (or incident to the pixel array) of the image sensor 413 under the control of the processor 450. In general, as the aperture value is increased, an amount of light reaching the image sensor 413 is reduced. As the aperture value is decreased, an amount of light reaching the image sensor 413 may be increased.

The image sensor 413 may generate an electrical signal based on the light incident from the outside and may generate digital image data (hereinafter, simply referred to as "image") based on the electrical signal. For example, the digital image data may include Bayer image data. The image sensor 413 may be implemented with for example, a charge-coupled device (CCD) or a complementary metal-oxide-semiconductor (CMOS).

According to an embodiment, the image sensor 413 may include a pixel array having a plurality of pixels arranged in the form of a lattice in two dimensions. The pixel array may include several millions of pixels or several tens of millions of pixels, and one of a plurality of colors may be allocated to each of the pixels. For example, the plurality of colors may include "red, green, and blue (RGB)" or "red, green, blue, and white (RGBW)".

The shutter 414 may adjust a time when the image sensor 413 is exposed to light. For example, if the shutter 414 operates slowly, a large amount of light is incident to the image sensor 413; if the shutter 414 operates quickly, a small amount of light is incident to the image sensor 413. A time when the shutter 414 operates may be adjusted based on a shutter speed. The shutter 414 may include a mechanical shutter or an electronic shutter of a way to control an image sensor.

The OIS modules 415-1 and 415-2 may dynamically adjust an arrangement (or position) of the lens 411 or the image sensor 413. The OIS modules 415-1 and 415-2 may finely adjust the arrangement of the lens 411 or the image sensor 413 in a direction of compensating for movement of a hand griping the electronic device 401. Accordingly, image shaking, which is caused by the shaking of the user hand, may be corrected.

According to an embodiment, the OIS modules 415-1 and 415-2 may not only correct the image shaking, but actively finely adjust the arrangement of the lens 411 or the image sensor 413 in a specified direction under the control of the processor 450 or the image signal processor 440. According to various embodiments, the OIS modules 415-1 and 415-2 may be referred to as a vibration reduction (VR) module, an image stabilizer (IS), an optical stabilizer (OS), an anti-shake (AS) module, a steady shot module, and the like, according to a manufacturer of the electronic device 401.

The image sensor I/F 420 may mediate data transmission and reception between the image sensor 413 and another component (e.g., the volatile memory 430, the image signal processor 440, or the like). For example, the image sensor I/F 420 may transmit image data generated from the image sensor 413 to the volatile memory 430.

The volatile memory 430 may include, for example, a dynamic random access memory (DRAM), a static RAM (SRAM), or a synchronous dynamic RAM (SDRAM)). According to an embodiment, the volatile memory 430 may receive and store image data generated from the image sensor 413 through the image sensor I/F 420.

The image signal processor 440 may have a configuration (e.g., integrated chip) for improving image quality or for automatically optimizing exposure, white balance, contrast, or the like. The image signal processor 440 is electrically connected with the volatile memory 430 to acquire or receive image data, which are generated from the image sensor 413, from the volatile memory 430. The image signal processor 440 may process the acquired image data according to various embodiments of the present invention.

According to an embodiment, the image signal processor 440 may include a plurality of image processing (IP) blocks to perform specific image processing. The image signal processor 440 may establish a first processing chain and a second processing chain (or more) by at least one IP block of the plurality of IP blocks, based on specified control information (information on enabling/disabling a specific image effect) received from the outside (e.g., the processor 450). For example, a first group of IP blocks selected from the plurality of image sensors may be arranged on the first processing chain, and a second group of image processing blocks selected from the plurality of image sensors may be arranged on the second processing chain.

According to an embodiment, when image data generated from the image sensor 413 is received, the image signal processor 440 may divide the image data into first image data, which is a portion of the image data, and second image data which is another portion of the image data. For example, the image signal processor 440 may distinguish between the first image data and the second image data by using depth information (e.g., a depth map) of the image data.

The image signal processor 440 may process the first image data by using a first group of image processing blocks on the first processing chain, and may process the second image data by using a second group of image processing blocks on the second processing chain. First image data and second image data, which have been processed, may be stored in the volatile memory 430.

Although FIG. 4 illustrates that the image signal processor 440 includes a circuit component (e.g., an IC chip) independent from the processor 450, the image signal processor 440 may be implemented as a component (e.g., one-chip) integrated with the processor 450 according to various embodiments. The configuration of the image sensor 413 will be described in more detail with reference to FIGS. 5 and 6.

The processor 450 may include one or more of central processing units (CPU), application processors (AP), or communication processors (CP). The processor 450 may perform, for example, data processing or an operation associated with control and/or communication of at least one different components 410 to 440, 460, and 470) included in the electronic device 401. For example, the processor 450 may provide control information associated with correction or an image effect to the image signal processor 440. For another example, the processor 450 may read out image data, which has been completely processed by the image signal processor 440, from the volatile memory 430, may output the image data on the display 460 or may store the image data in the nonvolatile memory 470.

The display 460 may include, for example, an LCD, an LED display, an OLED display, an MEMS display, or an electronic paper display. The display 460 may display, for example, an image taken through the camera module 410, and may display an image corrected by the image signal processor 440. According to various embodiments, the display 460 may include a touch screen and may receive, for example, a touch, gesture, proximity, or a hovering input by using an electronic pen or a part of a user's body.

For example, the nonvolatile memory 470 may store image data files serving as final results obtained from the image signal processor 440. The nonvolatile memory 470 may include, for example, an OTPROM, a PROM, an EPROM, an EEPROM, a mask ROM, a flash ROM, a flash memory (e.g., a NAND flash, a NOR flash, or the like)), a hard disk drive (HDD), or a solid state drive (SSD).

Figure 5:
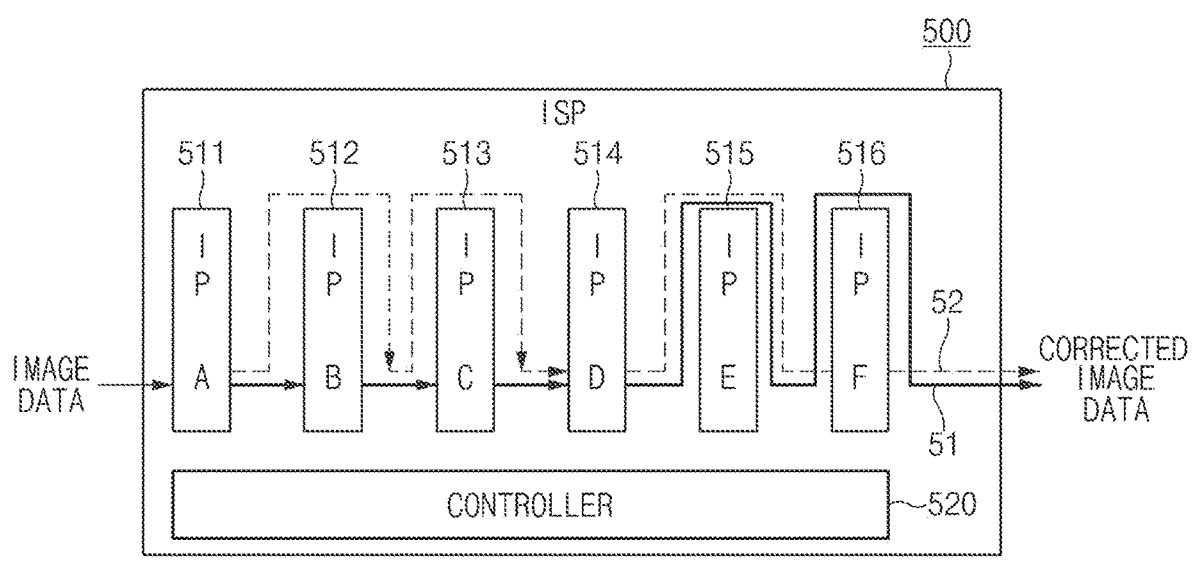
FIG. 5 illustrates a block diagram of an image signal processor, according to an embodiment.

FIG. 5 illustrates a block diagram of an image signal processor, according to an embodiment.

Referring to FIG. 5, according to an embodiment, an image signal processor 500 may include a plurality of image processing blocks (hereinafter, referred to as "IP block") 511 to 516 and a controller 520. The image signal processor 500 may correspond to, for example, the image signal processor 440 illustrated in FIG. 4.

The IP blocks, for example, the IP_A 511 to the IP_F 516 may be allocated with specific image processing functions and may include circuit configurations corresponding to the image processing functions. According to various embodiments, the IP blocks may be referred to as "image processing filters" and "image processing modules". In addition, the number of the IP blocks included in the image signal processor 500 is not limited to the example illustrated in FIG. 5. For example, the image signal processor 500 may include more than six IP blocks or less than six IP blocks.

According to various embodiments, the IP blocks, for example, the IP_A 511 to the IP_F 516 may correspond to a preset IP block, an IP block for color interpolation, an IP block for lens shading correction, an IP block for auto white balance, an IP block for lateral chromatic aberration correction, an IP block for optical inverse correction, an IP blocks for noise reduction, an IP block for edge enhancement, an IP block for gamma correction, or an IP block for "out of focusing".

According to an embodiment, the preset IP block may correspond to the IP_A 511. The IP_A 511 may divide image data, which is generated from the image sensor, into first image data and second image data. For example, the preset IP block may distinguish between the first image data and the second image data by using depth information of the image data. For example, the first image data may include data, which is associated with an on-focused subject, of the image data. In addition, the second image data may include remaining data (e.g., data corresponding to a background image) of the image data other than the data associated with the on-focused subject.

The controller 520 may be, for example, implemented with an ASIC or an FPGA and may operate together with the IP blocks 511 to 516 through inter-integrated circuit (I2C) communication. According to an embodiment, the controller 520 may establish a processing chain by at least one IP block of the IP blocks 511 to 516, based on specified control information (information on enabling/disabling a specific image effect).

For example, the controller 520 may select, for the first image data, the first group of IP blocks (e.g., IP_B 512, IP_C 513, and IP_D 514) from among the IP blocks 511 to 516 based on specified control information. The processing chain of the first group of IP blocks may be referred to as a "first processing chain 51".

For example, the controller 520 may select, for the second image data, the second group of IP blocks (e.g., IP_D 514 and IP_F 516) from among for the IP blocks 511 to 516 based on specified control information. The processing chain of the second group of IP blocks may be referred to as a "second processing chain 52".

According to various embodiments, the first group of IP blocks and the second group of IP blocks may be not mutually exclusive. For example, some IP blocks (e.g., IP_D 514) may be included in both the first group of IP blocks and the second group of IP blocks.

According to an embodiment, the first processing chain 51 may be established to bypass remaining IP blocks (e.g., IP_E 515 and IP_F 516) other than the preset IP block (e.g., IP_A 511) and the first group of IP blocks (e.g., IP_B 512, IP_C 513, and IP_D 514). Similarly, the second processing chain 52 may be established to bypass remaining IP blocks (e.g., IP_B 512, IP_C 513, and IPE 515) other than the preset IP block (e.g., IP_A 511) and the second group of IP blocks (e.g., IP_D 514 and IP_F 516).

According to an embodiment, IP blocks, which are excluded from the first group of IP blocks and the second group of IP blocks, may be excluded (bypassed) from the first processing chain 51 and the second processing chain 52 in various manners. For example, the controller 520 may shut off power (or clock) supplied to the excluded IP blocks or the input stages of the excluded IP blocks are set to be identical to the output stages of the excluded IP blocks, such that the excluded IP blocks may be excluded from the first processing chain 51 and the second processing chain 52.

According to an embodiment, the first group of IP blocks may process the first image data along the first processing chain 51 established by the controller 520. In addition, the second group of IP blocks may process the second image data along the second processing chain 52 established by the controller 520. The first image data and the second image data, which serve as corrected image data, may be stored or written in the nonvolatile memory.

Although the above description has been made with reference to FIG. 5 in that the first group of IP blocks includes the IP_B 512, the IP_C 513, and the IP_D 514 and the second group of IP blocks includes the IP_D 514 and the IP_F 516, the present disclosure is not limited thereto. For example, the first group of IP blocks and the second group of IP blocks may include various combinations of IP blocks. In addition, the first processing chain 51 and the second processing chain 52 are provided for the illustrative purpose, and processing or bypassing may be performed through various combinations of IP blocks 511 to 516.

Figure 6:
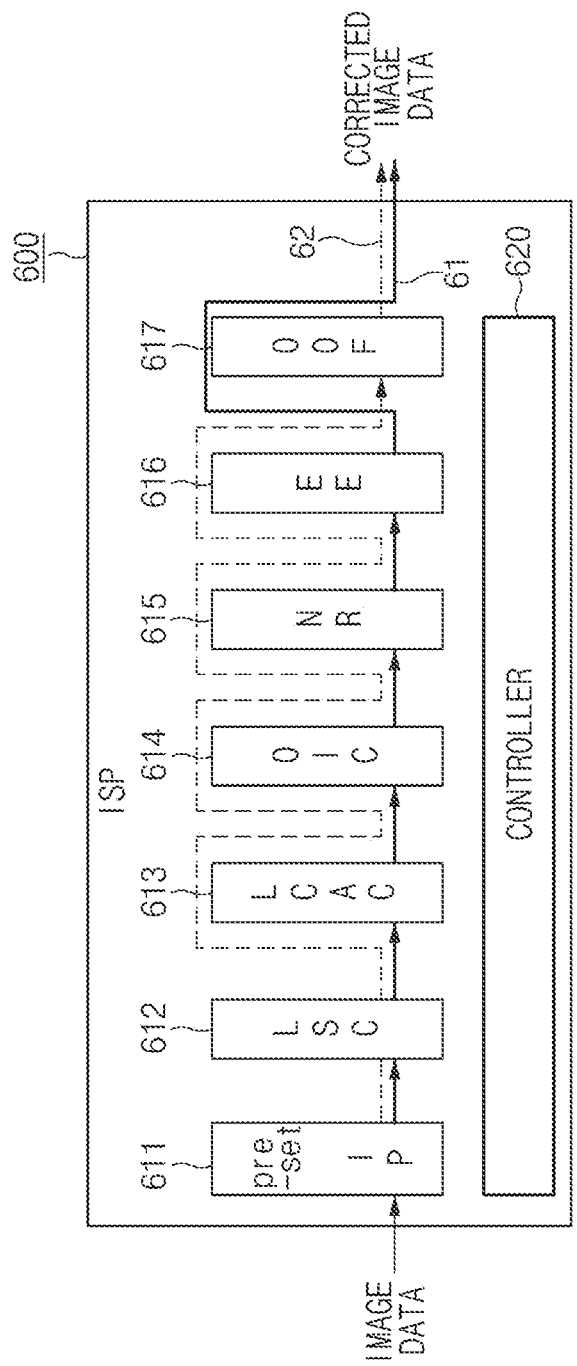
FIG. 6 illustrates a block diagram of an image signal processor, according to another embodiment.

FIG. 6 illustrates a block diagram of an image signal processor, according to another embodiment.

Referring to FIG. 6, according to an embodiment, an image signal processor 600 may include a plurality of IP blocks 611 to 617 and a controller 620. The image signal processor 600 may correspond to, for example, the image signal processor 440 illustrated in FIG. 4 or the image signal processor 500 illustrated in FIG. 5. The redundant repeat associated with FIG. 5 will be omitted below.

According to an embodiment, the preset IP block 611 may divide image data, which is generated from an image sensor, into first image data and second image data. For example, the preset IP block 611 may distinguish between the first image data and the second image data by using depth information of the image data. For example, the first image data may include data, which is associated with an on-focused subject, of the image data. In addition, the second image data may include remaining data (e.g., data corresponding to a background image) of the image data other than the data associated with the on-focused subject.

A lens shading correction (LSC) IP block 612 may correct a phenomenon (so called, lens shading) that the edge of the image sensor becomes darker due to different transmittances of light incident through a lens.

A lateral chromatic aberration correction (LCAC) IP block 613 may correct chromatic aberration of light incident through the lens. This is because the light incident through the lens has different refractive indexes based on wavelengths. Bigger chromatic aberration may be made at the edge of the image sensor.

An optical inverse correction (OIC) IP blocks 614 corrects a phenomenon that an image is blurred (Bokeh) toward the edge of the image. This is because the light incident through the lens has different diffraction indexes and different refractive indexes depending on portions of the lens through which the relevant light is transmitted.

A noise reduction IP block 615 may remove noise included in an image generated from the image sensor.

An edge enhancement (EE) IP block 616 may shape an edge of an object such as a subject included in the image generated from the image sensor.

An out of focus (OOF) IP block 617 may perform blurring (or bokeh) with respect to a portion (that is, an out-of-focused part) other than the on-focused portion. Accordingly, the on-focused portion (e.g., the main subject) may be highlighted from remaining portions. The blurred degree of the out-of-focused portion may be strengthened as the value of "F" of a camera module is decreased.

According to an embodiment, the controller 620 may establish a processing chain by at least one IP block of the IP blocks 611 to 617, based on specified control information (e.g., control information for enabling OOF).

For example, the controller 620 may establish a first processing chain 61 for processing first image data associated with the on-focused subject, based on control information for enabling OOF. The first group of IP blocks on the first processing chain 61 may include at least one selected from remaining IP block of the IP blocks 611 to 616 other than the preset IP block 611 and the OOF IP block 617 based on the control information. For example, the first group of IP blocks may include the LSC IP block 612, the LCAC IP 613, the OIC IP block 614, the NR IP block 615, and the EE IP block 616.

For example, the controller 620 may establish a second processing chain 62 for processing second image data (e.g., background image data) other than data associated with the on-focused subject, based on control information for enabling OOF. The second group of IP blocks on the second processing chain 62 may at least include the OOF IP block 617, and may not include most IP blocks, which is different from the first group of IP blocks. For example, the second group of IP blocks may include the LSC IP block 612 and the OOF IP block 617.

The first group of IP blocks may process the first image data along the first processing chain 61. In addition, the second group of IP blocks may process the second image data along the second processing chain 62. The first image data and the second image data, which serve as corrected image data, are stored or written in the volatile memory. Thereafter, the first image data and the second image data may be output through the display or may be stored in the nonvolatile memory.

Figure 7:
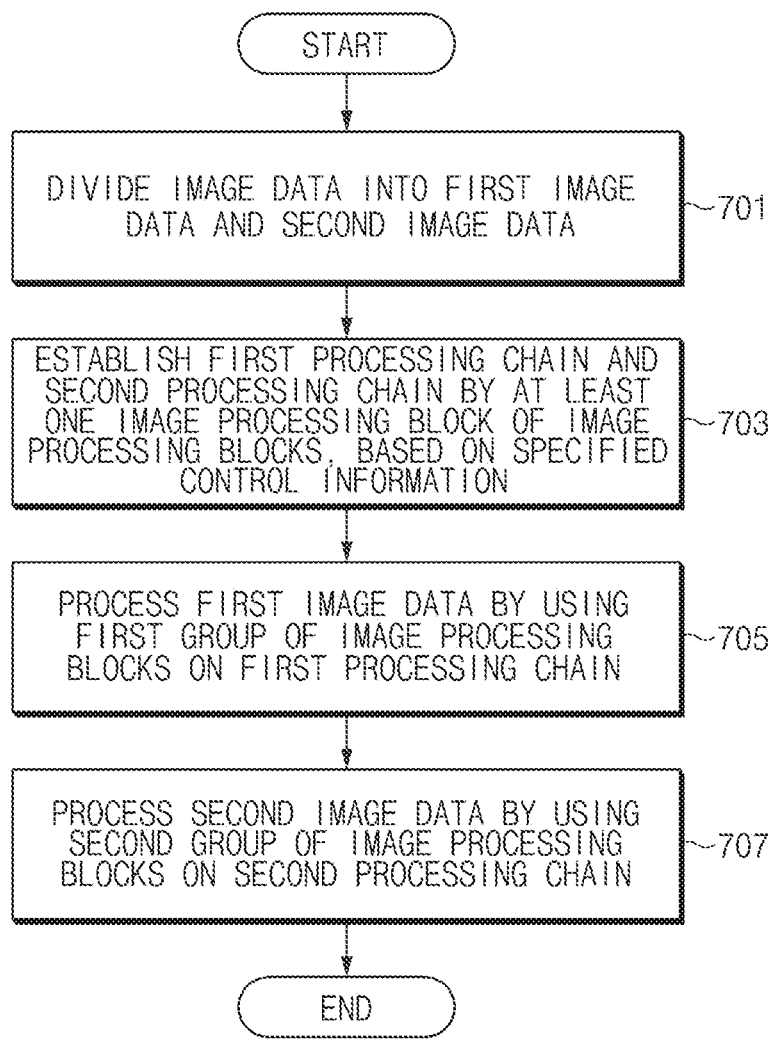
FIG. 7 is a flowchart illustrating a method for processing an image signal, according to an embodiment.

FIG. 7 is a flowchart illustrating a method for processing an image signal, according to an embodiment. In addition, FIG. 8 is a view illustrating a method for processing an image signal, according to an embodiment.

Referring to FIG. 7, according to an embodiment, the method for processing the image signal may include operation 701 to operation 707. Operation 701 to operation 707 may be performed by the electronic device 401 illustrated in FIG. 4, the image signal processor 500 illustrated in FIG. 5, or the image signal processor 600 illustrated in FIG. 6. Each of operation 701 to operation 707 may be implemented with, for example, instructions (command) executable (or readable) by an image signal processor or a processor. The instructions may be embedded in, for example, a computer recording medium, the image signal processor 440 illustrated in FIG. 4, the image signal processor 500 illustrated in FIG. 5, or the image signal processor 600 illustrated in FIG. 6. Hereinafter, when operation 701 to operation 707 is described, the reference numerals of FIG. 6 will be used, and the reference to FIG. 8 will be made for the convenience of explanation.

In operation 701, when image data is received from the image sensor, the preset IP block 611 of the image signal processor 600 may divide the image data into first image data and second image data.

Figure 8:
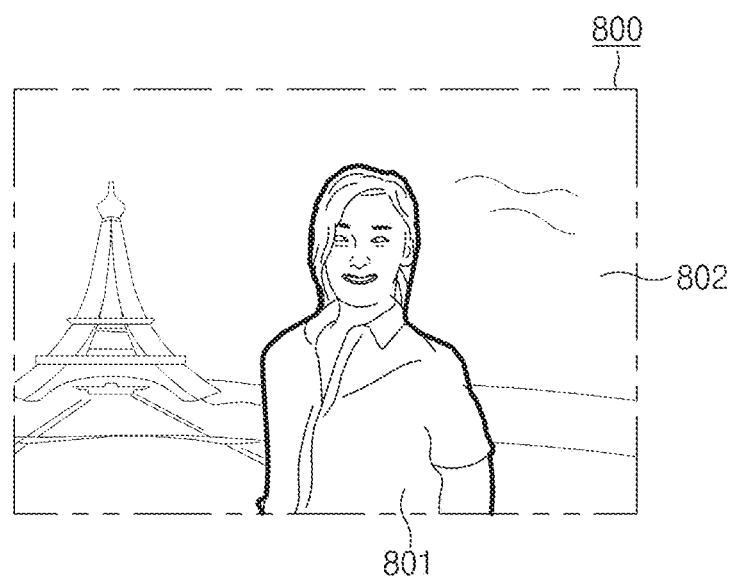
FIG. 8 is a view illustrating a method for processing an image signal, according to an embodiment.

For example, referring to FIG. 8, the preset IP block 611 may distinguish between first image data 801 and second image data 802 by using depth information of image data 800. For example, the first image data includes data, which is associated with an on-focused subject, of the image data. In addition, the second image data includes remaining data (e.g., data corresponding to a background image) of the image data other than the data associated with the on-focused subject.

In operation 703, the controller 620 of the image signal processor 600 may establish the first processing chain 61 and the second processing chain 62 by at least one IP block of the IP blocks 611 to 617, based on specified control information (e.g., control information for enabling OOF). For example, the first processing chain 61 may correspond to a chain for processing the first image data 801 of FIG. 8 and the second processing chain 62 may correspond to a chain for processing the second image data 802 of FIG. 8.

According to an embodiment, the first group of IP blocks for establishing the first processing chain 61 may be selected from among remaining IP blocks 612 to 616 other than the preset IP block 611 and the OOF IP block 617, based on the control information (e.g., control information for enabling OOF). For example, the first group of IP blocks may include the LSC IP block 612, the LCAC IP 613, the OIC IP block 614, the NR IP block 615, and the EE IP block 616. In this case, the OOF IP block 617 may be bypassed.

Meanwhile, the second group of IP blocks for establishing the second processing chain 62 may include the IP block 617 for the OOF, based on the control information (e.g., control information for enabling OOF). For example, the second group of IP blocks may include the LSC IP block 612 and the OOF IP block 617. In this case, the LCAC IP 613, the OIC IP block 614, the NR IP block 615, and the EE IP block 616 may be bypassed.

In operation 705, the first group of IP blocks may process the first image data (e.g., 801 of FIG. 8) along the first processing chain 61 established in operation 703. In other words, since the first image data 801 of FIG. 8 includes data on a subject (e.g., person), the first image data 801 may be processed by the first group of IP blocks, that is, the LSC IP block 612, the LCAC IP block 613, the OIC IP block 614, the NR IP block 615, and the EE IP block 616. Accordingly, the quality of the first image data 801 may be more increased.

In operation 707, the second group of IP blocks may process the second image data (e.g., 802 of FIG. 8) along the second processing chain 62 established in operation 703. In other words, since the second image data 802 of FIG. 8 includes data on a subject (e.g., background), the second image data 802 may be processed by the second group of IP blocks, that is, the LSC IP block 612 and the OOF IP block 617.

Since the OOF IP block 617 performs image processing (blurring or Bokeh) with respect to the image, as the OOF IP block 617 performs the image processing, the chromatic aberration correction by the LCAC IP block 613, the blurring correction of an image edge by the OIC IP block 614, noise reduction correction of the image by the NR IP block 615, and edge enhancement correction by the EE IP block 616 may be unnecessary or may be reduced in terms of the effect thereof even if the OOF IP block 617 is included in the second processing chain 62. However, according to an embodiment of the present invention, the LCAC IP block 613, the OIC IP block 614, the NR IP block 615, and the EE IP block 616 are bypassed and excluded, the time and the computing/memory resources consumed by the blocks 613 to 616 may be significantly reduced.

Although operation 705 and operation 707 are sequentially illustrated, the present disclosure is not limited thereto. In other words, after operation 707 is first performed, operation 705 may be performed. Alternatively, operation 705 and operation 707 may be substantially simultaneously performed. In addition, although images of FIGS. 7 and 8 are divided into two areas, the images may be divided into at least three areas and then may be processed along mutually different processing chains.

Figure 9:
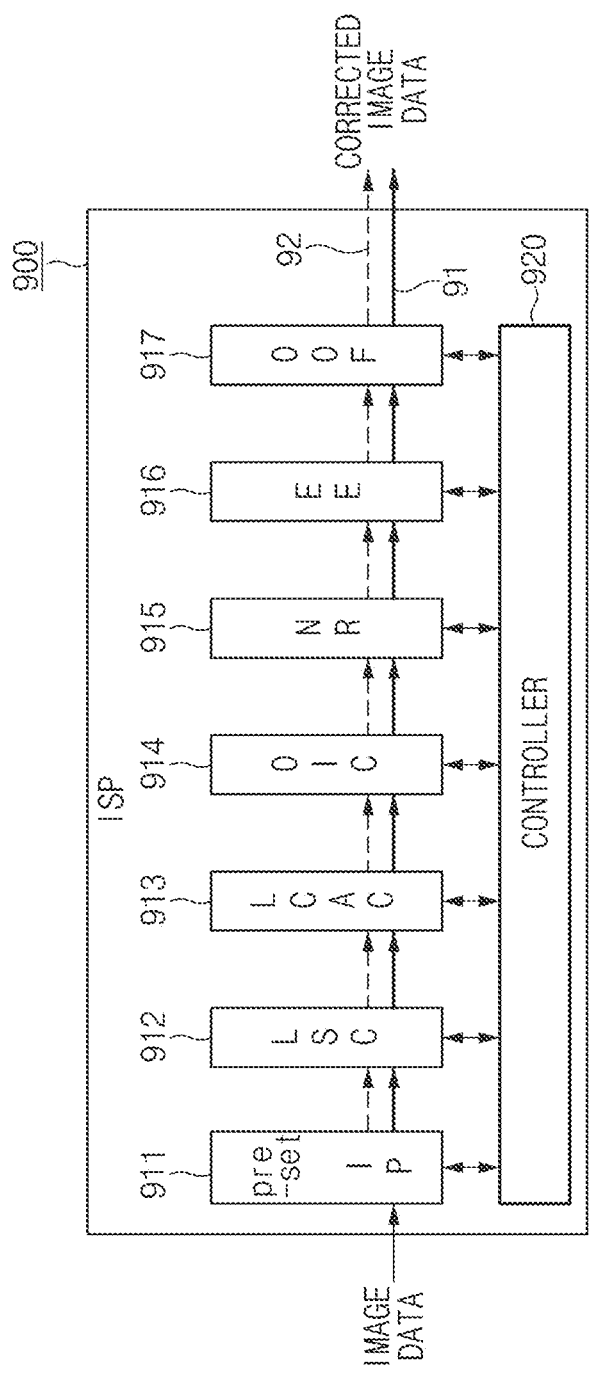
FIG. 9 illustrates a block diagram of an image signal processor, according to another embodiment.

FIG. 9 illustrates a block diagram of an image signal processor, according to another embodiment.

Referring to FIG. 9, according to an embodiment, an image signal processor 900 may include a plurality of IP blocks 911 to 917 and a controller 920. The image signal processor 900 may, for example, correspond to another example of the image signal processor 600 of FIG. 6. The redundant repeat associated with FIG. 6 will be omitted below.

According to an embodiment, the preset IP block 911 may divide image data, which is generated from an image sensor, into first image data and second image data. For example, the first image data includes data, which is associated with an on-focused subject, of the image data. In addition, the second image data includes remaining data (e.g., data corresponding to a background image) of the image data other than the data associated with the on-focused subject.

According to an embodiment, the first group of IP blocks on a first processing chain 91 may process (or correct) the first image data. In addition, the second group of IP blocks may process (or correct) the second image data along a second processing chain 92 the same as the first processing chain 91. Unlike FIG. 6, the first group of IP blocks may be the same as the second group of IP blocks. For example, the first group of IP blocks and the second group of IP blocks may include an LSC IP block 912, an LCAC IP block 913, an OIC IP block 914, an NR IP block 915, an EE IP block 916, and an OOF IP block 917.

According to an embodiment, the controller 920 may set image processing intensities of the IP blocks 912 to 917, which are used for correcting the first image data along the first processing chain 91, based on specified control information.

For example, the specified control information may correspond to control information for enabling an OOF function. In this case, the controller 920 may set the intensity for the image processing by the LSC IP block 912 to 60% of the maximum intensity for the image processing by the LSC IP block 912, set the intensity for the image processing by the LCAC IP block 913 to 70% of the maximum intensity for the image processing by the LCAC IP block 913, set the intensity for the image processing by the OIC IP block 914 to 85% of the maximum intensity for the image processing by the OIC IP block 914, set the intensity for the image processing by the NR IP block 915 to 95% of the maximum intensity for the image processing by the NR IP block 915, set the intensity for the image processing by the EE IP block 916 to 95% of the maximum intensity for the image processing by the EE IP block 916, and set the intensity for the image processing by the OOF IP block 917 to 5% of the maximum intensity for the image processing by the OOF IP block 917.

According to an embodiment, the controller 920 may set image processing intensities of the IP blocks 912 to 917, which are used for correcting the second image data along the second processing chain 92, based on specified control information. For example, at least one of remaining image processing blocks 912 to 916 of IP blocks 912 to 917 on the second processing chain 92 other than the OOF IP block 917 may be adjusted to absolutely decrease the image processing intensity (e.g., to be lower than a normal value) or to relatively decrease the image processing intensity (e.g., to be lower than a previously set value).

For example, the specified control information may correspond to control information for enabling an OOF function. In this case, the controller 920 may set the intensity for the image processing by the LSC IP block 912 to 10% of the maximum intensity for the image processing by the LSC IP block 912, set the intensity for the image processing by the LCAC IP block 913 to 10% of the maximum intensity for the image processing by the LCAC IP block 913, set the intensity for the image processing by the OIC IP block 914 to 5% of the maximum intensity for the image processing by the OIC IP block 914, set the intensity for the image processing by the NR IP block 915 to 95% of the maximum intensity for the image processing by the NR IP block 915, set the intensity for the image processing by the EE IP block 916 to 0% of the maximum intensity for the image processing by the EE IP block 916, and set the intensity for the image processing by the OOF IP block 917 to 95% of the maximum intensity for the image processing by the OOF IP block 917.

The first image data and the second image data corrected by the IP blocks 912 to 917 are stored or written in the volatile memory. Thereafter, the first image data and the second image data may be output through the display or may be stored in the nonvolatile memory.

According to an embodiment, the intensity for the image processing by the OOF IP block 917 may be set to a lower value with respect to the first image data including the subject and may be set to a higher value with respect to the second image data including a background image. In particular, since the image processing intensities may be set to lower values with respect to the IP blocks 911 to 916 which exhibit processing effects significantly lowered due to the image processing by the OOF IP block 917 which corrects the second image data. Accordingly, computing/storage resources may be significantly saved.

Figure 10:
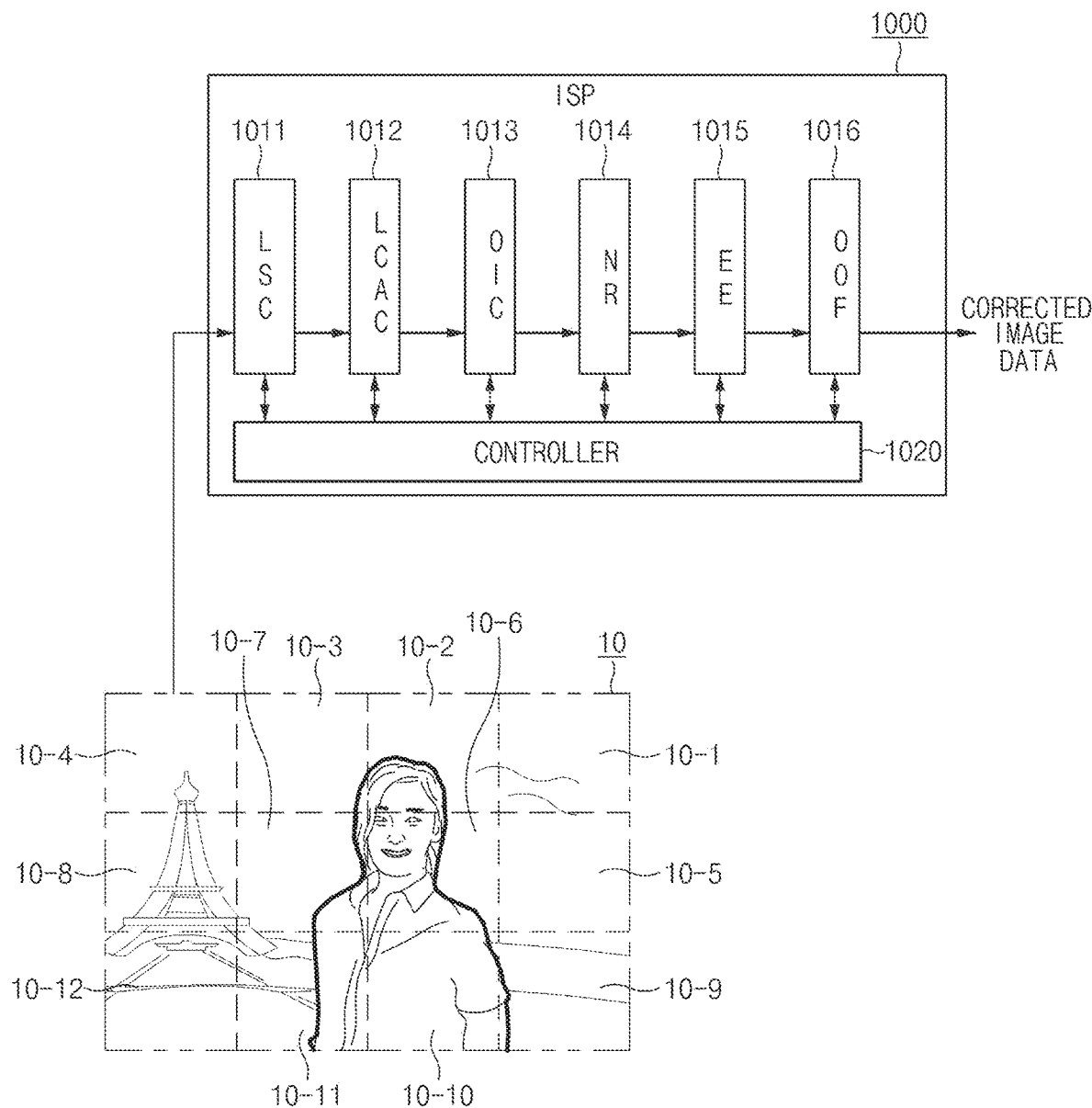
FIG. 10 illustrates a block diagram of an image signal processor, according to still another embodiment.

FIG. 10 illustrates a block diagram of an image signal processor, according to another embodiment Referring to FIG. 10, according to an embodiment, an image signal processor 1000 may include a plurality of IP blocks 1011 to 1016 and a controller 1020. The image signal processor 1000 may correspond to one example of the image signal processor 500 illustrated in FIG. 5. The redundant repeat associated with FIGS. 5 and 6 will be omitted below.

According to an embodiment, an image sensor of an electronic device may create image data 10 based on light incident from the outside. The image data 10 may be stored in a volatile memory through an image sensor interface.

According to an embodiment, the image signal processor 1000 may read a portion of the image data 10 out of the volatile memory in a preset block (or tile) unit. For example, the image signal processor 1000 may sequentially read data corresponding to 12 image tiles 10-1 to 10-12.

According to an embodiment, the image signal processor 1000 may correct image tiles 10-1 to 10-12 sequentially read by using a plurality of IP blocks 1011 to 1016 embedded in the image signal processor 1000.

According to an embodiment, the controller 1020 may set respective image processing intensities of the IP blocks 1011 to 1016 applied to the image tiles 10-1 to 10-12, respectively, which are sequentially read, based on specified control information.

For example, the specified control information may correspond to control information for enabling an OOF function. In this case, the controller 1020 may determine, by using the depth information of the image data 10, whether a subject is included in the image tile read out of the volatile memory, and a portion that the subject is included in the image tile. The controller 1020 may set the respective image processing intensities of the IP blocks 1011 to 1016, which are to be applied to the image tiles 10-1 to 10-12, respectively, based on whether the subject is included or the portion that the subject is included.

For example, since the image tile 10-1 constitutes a portion of the background image and does not include a subject, the controller 1020 may set the intensity for the image processing by the LSC IP block 1011 to 10% of the maximum intensity for the image processing by the LSC IP block 1011, set the intensity for the image processing by the LCAC IP block 1012 to 10% of the maximum intensity for the image processing by the LCAC IP 1012, set the intensity for the image processing by the OIC IP block 1013 to 5% of the maximum intensity for the image processing by the OIC IP block 1013, set the intensity for the image processing by the NR IP block 1014 to 5% of the maximum intensity for the image processing by the NR IP block 1014, set the intensity for the image processing by the EE IP block 1015 to 0% of the maximum intensity for the image processing by the EE IP block 2025, and set the intensity for the image processing by the OOF IP block 1016 to 95% of the maximum intensity for the image processing by the OOF IP block 1016.

For another example, since the image tile 10-10 constitutes a portion of a subject, the controller 1020 may set the intensity for the image processing by the LSC IP block 1011 to 60% of the maximum intensity for the image processing by the LSC IP block 1011, set the intensity for the image processing by the LCAC IP block 1012 to 70% of the maximum intensity for the image processing by the LCAC IP 1012, set the intensity for the image processing by the OIC IP block 1013 to 85% of the maximum intensity for the image processing by the OIC IP block 1013, set the intensity for the image processing by the NR IP block 1014 to 95% of the maximum intensity for the image processing by the NR IP block 1014, set the intensity for the image processing by the EE IP block 1015 to 95% of the maximum intensity for the image processing by the EE IP block 1015, and set the intensity for the image processing by the OOF IP block 1016 to 5% of the maximum intensity for the image processing by the OOF IP block 1016.

Meanwhile, when processing (correcting) image tiles other than the above described image tiles, the controller 1020 may set various intensities of image processing for the IP blocks 1011 to 1016 based on the proportion that the image tiles are included in the subject, or the depth information of the image files. In general, as the proportion that the image tiles are included in the subject is reduced, the intensity for the image processing by the OOF IP block 1016 may be set to a higher value.

Image tiles corrected by the IP blocks 1011 to 1016 may be stored or written in the volatile memory again, and then may be output through the display, or may be stored in a nonvolatile memory.

Figure 11:
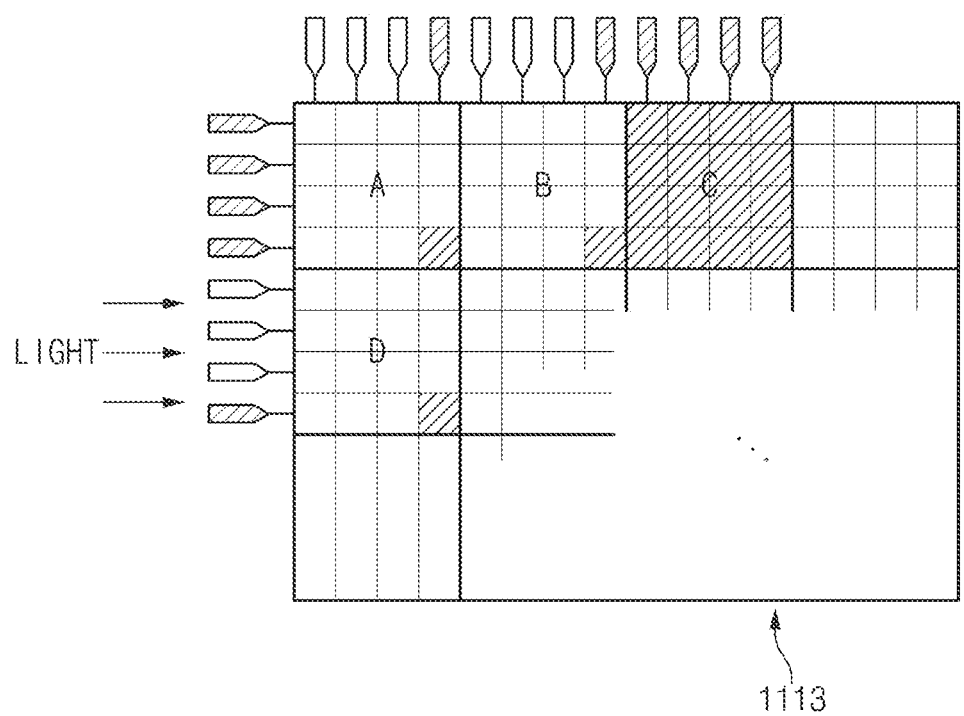
FIG. 11 is a view illustrating an image sensor, according to an embodiment.

FIG. 11 is a view illustrating an image sensor, according to an embodiment.

Referring to FIG. 11, according to an embodiment, an image sensor 1113 generates an electrical signal based on light incident from the outside and generates a digital image data through the analog to digital (A/D) conversion of the electrical signal. The image sensor 1113 may include the pixel array having several millions of pixels to several tens of millions of pixels two-dimensionally arranged in a lattice shape.

According to an embodiment, in partial areas A, B, C, and D of the image sensor 1113, n (e.g., 16) pixels may be arranged in a square (or rectangular) shape. The pixels included in the image sensor 1113 may include a micro-lens, a color filter, at least one photo-detector (e.g., a photodiode). Light may be converted to an electrical signal based on a photoelectric effect in the photo-detector of the pixel. The electrical signal may be converted into a pixel value which is a digital value through the A/D conversion. The set of pixel values from a plurality of pixels may constitute image data.

According to an embodiment, the image sensor 1113 may read out pixel values of the specific number of pixels (e.g., one pixel) included in the partial area or may read out pixel values of all pixels included in the partial area, based on control information from the processor.

For example, when receiving control information for enabling the OOF from the processor, the image sensor 1113 may specify partial areas (e.g., partial areas A, B, and D) having no subject. The image sensor 1113 may read out only pixel values of the specified number of pixels (e.g., one pixel) among pixels included in each specified partial area. In other words, when 16 pixels are included in one partial area such as the partial area A, B, or D, the image sensor 1113 may read a single pixel value (3 skip 1 read by row and/or column).

According to various embodiments, thereafter, the image signal processor may regard the specified number of pixel values (e.g., one pixel value) as equal values in all pixels included in the relevant pixel area. In other words, the pixel values of the pixels included in each partial area are regarded as being equal to each other by the image signal processor. Accordingly, the whole resolution of image data may be maintained without change.

For another example, when receiving control information for enabling OOF from the processor, the image sensor 1113 may specify a partial area (e.g., partial area C) having a subject and may read out pixel values of all pixels included in the specified partial area. For example, when 16 pixels are included in one partial area as in the partial area C, pixel values of 16 pixels may be read out.

According to various embodiments, when the pixel values are determined in the above-described manner, the pixel values (that is, the image data) of the partial area (e.g., the partial area C) having the subject may be corrected along the first processing chain 61 illustrated in FIG. 6 or along the first processing chain 91 illustrated in FIG. 9. Meanwhile, the value (that is, image data) of a single pixel included in the partial area (e.g., partial areas A, B, and D) having no subject may be corrected along the first processing chain 61 illustrated in FIG. 6 or the first processing chain 91 illustrated in FIG. 9.

In the case of partial areas (e.g., partial areas A, B, and D), which have no subject and are to be applied with OOF, the pixel values of a large number of pixels (pixels not shaded in the partial areas A, B, and D) are not read out by the image sensor 1113.

According to the OOF function, since blurring is performed with respect to an area which does not include a subject, even if the blurring is performed based on pixel values of some pixels included in the partial area, the same effect may be substantially produced when compared with the case of reading pixel values out of all pixels included in the partial area. Therefore, according to the image sensor 1113, there may be saved computing resources used to read out the pixel values of a large number of pixels (pixels not shaded in the partial areas A, B, and D) included in the partial area.

According to the image signal processor and the electronic device in the embodiments disclosed in the present disclosure, when specific correction processing is unnecessary for a partial area (e.g., the background of an image), the unnecessary specific correction processing may be bypassed. When the effect of another image correction processing is lowered due to the specific correction processing (e.g., out of focus), the correction processing causing the effect to be lowered may be bypassed. The time and the computing/memory resources required in image processing may be significantly reduced while a corrected image is acquired without actual difference in image quality.

As described above, according to an embodiment, an electronic device may include an image sensor to generate image data based on light that is incident and an image signal processor (ISP) including a plurality of image processing (IP) blocks and processing the image data. The ISP may establish a first processing chain and a second processing chain by at least one IP block of the plurality of IP blocks, based on specified control information, may divide the image data into first image data and second image data, when receiving the image data, may process the first image data by using a first group of IP blocks on the first processing chain, and may process the second image data by using a second group of IP blocks on the second processing chain.

According to another embodiment, the first image data includes data, which is associated with an on-focused subject, of the image data.

According to another embodiment, the second image data includes remaining data of the image data other than the data associated with the on-focused subject.

According to another embodiment, the plurality of IP blocks may include a preset IP block, an IP block for color interpolation, an IP block for lens shading correction, an IP block for an auto-white balance, an IP block for chromatic aberration correction, an IP block for optical inverse correction, an IP block for noise reduction, an IP block for edge enhancement, an IP block for gamma correction, an IP block for out of focus, or the combination thereof.

According to another embodiment, the image signal processor may be configured to distinguish between the first image data and the second image data by using depth information of the image data.

According to another embodiment, the first group of IP blocks may include at least one selected from remaining IP blocks of the plurality of IP blocks other than the preset IP block and an IP block for out of focus, based on the specified control information.

According to another embodiment, the second group of IP blocks may at least include an IP block for out of focus.

According to another embodiment, at least one of remaining IP blocks of the second group of IP blocks other than the IP block for out-of-focus is adjusted such that an image processing intensity is lowered.

According to another embodiment, the first processing chain may be established to bypass remaining blocks other than a preset IP block and the first group of IP blocks, and the second processing chain may be established to bypass remaining blocks other than the preset IP block and the second group of IP blocks.

According to another embodiment, some IP blocks of the plurality of IP blocks are included in the first group of IP blocks and the second group of IP blocks.

According to an embodiment, an image signal processor (ISP) may include a plurality of image processing (IP) blocks and a controller to establish a processing chain by at least one IP block of the plurality of IP blocks, based on specified control information. When image data generated by an image sensor is received, a preset IP block may divide the image data into first image data and second image data, a first group of IP blocks may process the first image data along a first processing chain established by the controller, and a second group of IP blocks may process the second image data along a second processing chain established by the controller.

According to another embodiment, the first image data includes data, which is associated with an on-focused subject, of the image data.

According to another embodiment, the second image data includes remaining data of the image data other than the data associated with the on-focused subject.

According to another embodiment, the plurality of IP blocks may include a preset IP block, an IP block for color interpolation, an IP block for lens shading correction, an IP block for an auto-white balance, an IP block for chromatic aberration correction, an IP block for optical inverse correction, an IP block for noise reduction, an IP block for edge enhancement, an IP block for gamma correction, an IP block for out of focus, or the combination thereof.

According to another embodiment, the image signal processor may be configured to distinguish between the first image data and the second image data by using depth information of the image data.

According to another embodiment, the first group of IP blocks may include at least one selected from remaining IP blocks of the plurality of IP blocks other than the preset IP block and an IP block for out of focus, based on the specified control information.

According to another embodiment, the second group of IP blocks may at least include an IP block for out of focus.

According to another embodiment, the first processing chain may be established to bypass remaining blocks other than the preset IP block and the first group of IP blocks, and the second processing chain may be established to bypass remaining blocks other than the preset IP block and the second group of IP blocks.

According to another embodiment, some IP blocks of the plurality of IP blocks are included in the first group of IP blocks and the second group of IP blocks.

According to an embodiment, a method for processing an image signal may include dividing, when receiving an image data from an image sensor, the image data into first image data and second image data, establishing a first processing chain and a second processing chain by at least one IP block of a plurality of IP blocks, based on specified control information, processing the first image data by using a first group of IP blocks on the first processing chain, and processing the second image data by using a second group of IP blocks on the second processing chain.

According to another embodiment, the dividing of the image data may include distinguishing between the first image data and the second image data by using depth information of the image data.

According to another embodiment, the establishing of the first processing chain may include establishing the first processing chain to bypass remaining blocks other than the first group of IP blocks. The establishing of the second processing chain may include establishing the second processing chain to bypass remaining blocks other than the second group of IP blocks.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
an image sensor configured to generate image data based on light that is incident; and
an image signal processor (ISP) including a plurality of image processing (IP) blocks and configured to process the image data,
wherein the ISP is further configured to:
establish a first processing chain by selecting at least one IP block of the plurality of IP blocks based on specified control information comprising information on enabling/disabling a specific image effect,
establish a second processing chain by selecting at least one other IP block of the plurality of IP blocks based on the specified control information,
divide the image data into first image data and second image data, when receiving the image data,
process the first image data by using a first group of IP blocks on the first processing chain, and
process the second image data by using a second group of IP blocks on the second processing chain, and
wherein the ISP is further configured to divide the image data into the first image data and the second image data based on depth information of the image data.

2. The electronic device of claim 1, wherein the first image data includes data, which is associated with an on-focused subject of the image data.

3. The electronic device of claim 2, wherein the second image data includes remaining data of the image data other than data associated with the on-focused subject.

4. The electronic device of claim 1, wherein the plurality of IP blocks include at least one of a preset IP block, an IP block for color interpolation, an IP block for lens shading correction, an IP block for an auto-white balance, an IP block for chromatic aberration correction, an IP block for optical inverse correction, an IP block for noise reduction, an IP block for edge enhancement, an IP block for gamma correction, an IP block for out of focus, or a combination thereof.

5. The electronic device of claim 1, wherein the first group of IP blocks comprises at least one IP block selected from remaining IP blocks of the plurality of IP blocks other than a preset IP block and an IP block for out of focus based on the specified control information.

6. The electronic device of claim 1, wherein the second group of IP blocks includes an IP block for out of focus.

7. The electronic device of claim 6, wherein at least one of remaining IP blocks of the second group of IP blocks other than the IP block for out of focus is adjusted such that an IP intensity is lowered.

8. The electronic device of claim 1,
wherein the first processing chain is established to bypass remaining blocks other than a preset IP block and the first group of IP blocks, and
wherein the second processing chain is established to bypass remaining blocks other than the preset IP block and the second group of IP blocks.

9. The electronic device of claim 1, wherein one or more IP blocks of the plurality of IP blocks are included in the first group of IP blocks and the second group of IP blocks.

10. An image signal processor (ISP) comprising:
a plurality of image processing (IP) blocks; and
a controller configured to:
establish a first processing chain by selecting at least one IP block of the plurality of IP blocks based on specified control information comprising information on enabling/disabling a specific image effect, and
establish a second processing chain by selecting at least one other IP block of the plurality of IP blocks based on the specified control information,
wherein, when image data generated by an image sensor is received, a preset IP block divides the image data into first image data and second image data,
wherein a first group of IP blocks processes the first image data along the first processing chain established by the controller,
wherein a second group of IP blocks processes the second image data along the second processing chain established by the controller, and
wherein the preset IP block is configured to distinguish between the first image data and the second image data by using depth information of the image data.

11. The image signal processor of claim 10,
wherein the first image data includes data, which is associated with an on-focused subject, of the image data, and
wherein the second image data includes remaining data of the image data other than the data associated with the on-focused subject.

12. The image signal processor of claim 10,
wherein the first group of IP blocks includes at least one IP block selected from remaining IP blocks of the plurality of IP blocks other than the preset IP block and an IP block for out of focus based on the specified control information, and
wherein the second group of IP blocks includes the IP block for out of focus.

13. The image signal processor of claim 10,
wherein the first processing chain bypasses remaining blocks other than the preset IP block and the first group of IP blocks, and
wherein the second processing chain bypasses remaining blocks other than the preset IP block and the second group of IP blocks.

14. The electronic device of claim 1, where an excluded IP block of the plurality of IP blocks is excluded from the first processing chain and the second processing chain.

* * * * *